United States Patent [19]
Zimmermann

[11] Patent Number: 5,983,494
[45] Date of Patent: Nov. 16, 1999

[54] METHOD OF SWITCHING OVER TELECOMMUNICATIONS CABLES WITHOUT INTERRUPTION, AND SWITCHOVER PLUG FOR USE IN THE METHOD

[75] Inventor: Wolfgang Zimmermann, Aspach, Germany

[73] Assignees: Ria Zimmerman; Gabriele Rosendahl, both of Germany

[21] Appl. No.: 08/765,921

[22] PCT Filed: Apr. 21, 1995

[86] PCT No.: PCT/DE95/00551

§ 371 Date: May 1, 1997

§ 102(e) Date: May 1, 1997

[87] PCT Pub. No.: WO96/01514

PCT Pub. Date: Jan. 18, 1996

[30] Foreign Application Priority Data

Jul. 5, 1994 [DE] Germany .............................. 44 23 393

[51] Int. Cl.[6] ................................................. H01R 43/00
[52] U.S. Cl. ................................ 29/868; 29/809; 156/49; 174/73.1; 140/115
[58] Field of Search ............................ 29/868, 869, 755; 174/73.1, 88 R; 156/49; 140/115, 119; 269/903

[56] References Cited

U.S. PATENT DOCUMENTS

| | | |
|---|---|---|
| 4,512,828 | 4/1985 | Helm ..................................... 29/868 X |
| 4,675,895 | 6/1987 | Neail et al. . |
| 4,817,282 | 4/1989 | Markwardt . |
| 5,477,507 | 12/1995 | Kaplan ................................... 29/868 X |

FOREIGN PATENT DOCUMENTS

A-2334334 1/1975 Germany .
20 24 537 B2 3/1980 Germany .

OTHER PUBLICATIONS

Telephone Enginees and Management vol. 89, No. 10, 140–144, May 15, 1985.

*Primary Examiner*—Carl J. Arbes
*Attorney, Agent, or Firm*—Darby & Darby, P.C.

[57] ABSTRACT

A changeover plug-in device (50; 60) for a wire connecting strip device (34; 68) for the uninterrupted changeover of wires (26) of a telecommunications cable (24), the wire connecting strip device (34) preferably having a wire connecting strip (36), a base unit (40) and a cover unit (38) and the wire connecting strip (36) having contact units (42) for the respective connection of the incoming/outgoing wire (27; 28) of an incoming/outgoing telecommunications cable (32; 22) in order to produce an electrical contact between the respective incoming and outgoing wires (27, 28), and there being for each contact unit a test opening which is open to the outside, is distinguished by the fact that the changeover plug-in device (50; 60) has a first contact device (52) having contact elements (56) and a second contact device (54), in contact with the first contact device (52) and having contact elements (56), and the changeover plug-in device (50; 60) is designed in such a way that, in the plugged-on state, the contact elements (56), which can be guided into the test openings (44), of the first and/or second contact device in each case produce contact with the contact units (42) of the respective wire connecting strip device (34; 68).

23 Claims, 10 Drawing Sheets

METHOD OF SWITCHING OVER TELECOMMUNICATIONS CABLES WITHOUT INTERRUPTION, AND SWITCHOVER PLUG FOR USE IN THE METHOD

BACKGROUND OF THE INVENTION

The present invention relates to a changeover device, preferably for a wire connecting strip device, for the uninterrupted changeover of wires of a telecommunications cable having a plurality of (twin) wires, the wire connecting strip device having, in particular, a wire connecting strip, a base unit and a cover unit, and the wire connecting strip having contact units for the respective connection of the wire of an incoming telecommunications cable and an outgoing telecommunications cable, in order to produce an electrical contact between the respective wires of the incoming and outgoing telecommunications cable, the wire connecting strip having a test opening, open to the outside, for each contact unit. The present invention relates to a process for changing over from an existing damaged or disturbed, and therefore to be exchanged, telecommunications cable, or the wires of the telecommunications cable, to new undisturbed wires, in particular to a new telecommunications cable drawn in in parallel with the existing one in a cable duct between two connecting sleeves, the connection between incoming and outgoing telecommunications cable or wire being carried out at a connecting sleeve by means of a wire connecting strip device.

Wire connecting strips have been used for years for connecting the (twin) wires in telecommunications cable. As a result of cable disturbances and new plans, the previous lead- or plastic-sheathed cables are being exchanged daily. For this reason, more and more work occurs on existing cables which are coupled to one another using wire connecting strips. Even the latest generation of cables, for example PE cables, that is to say with plastic insulation of the copper wires, often have to be exchanged.

DESCRIPTION OF THE PRIOR ART

A plug device for plugging onto the test contacts of a wire connecting strip device for the uninterrupted changeover of telecommunications cables is not known. In the case of the known process, the work is carried out as follows. Firstly it is assumed that a new telecommunications cable has already been drawn into the cable duct between two connecting sleeves to which in each case the new telecommunications cable has to be connected, and is available at the respective connecting sleeve with its stripped, exposed individual wires. The two connecting sleeves are allocated fitters (A+B). Fitter A connects the respective wires to the connecting strip by means of a known wire connecting strip. This is normally carried out by means of a splicing comb. In this case, a wire connecting strip is employed which is known, in the telecommunications sector, by the abbreviation AVL U. Fitter B splices the new cable length into a normal wire connecting strip (AVL). The incoming telecommunications cables which are not to be exchanged in the respective connecting sleeve, and to which the connection has to be made, are set back in the range from about 30 cm to 1.0 m, in order that a supply loop of individual wires is produced, which is in turn needed in order to be able to insert the (twin) wires (DA) into the new AVL or AVL U.

In the case of this process, the existing sleeves, which surround the respective AVL on grounds of tightness, must be removed completely. If the old cable, which is still in operation, is taut and led straight through the cable duct or the ground soldering point, the necessary supply loop must be produced without interruption (telecommunications designation DAV U or AAKv (UPB)) using a twin wire connector, said supply loop being needed for the insertion of the respective wires into the AVL. Using the AVL U on one side, a triangular or parallel circuit (also called a node splice) is produced. In the event of taut cable guidance, the fitter at the other interface must also lengthen the DA as already described. As soon as fitter B has changed over his DA, the triangular circuit can be removed. Both connecting points are to be reclosed, using sleeves, following the production of the connection. The known procedure is very time consuming and hence cost intensive. Furthermore, a relatively large amount of material is needed, since the sleeves and wire connecting strips which are present are no longer used.

SUMMARY OF THE INVENTION

The present invention is based on the technical problem or the object of specifying a process of the type mentioned in the introduction and a changeover device suitable for employment in this process which ensures economical employment, in particular with regard to low cost, by means of a distinctly reduced working time and a distinctly lower expenditure on materials.

The process according to the invention is accordingly distinguished by the process steps to be undertaken at both end regions (splice points) of the old or incoming/outgoing wires, using a changeover plug-in device having a first and second contact device: a) electrically conductive connection of undisturbed, temporary wires to the first contact device, b) electrically conductive connection of the second contact device to the incoming and outgoing wires, the first contact device being electrically conductively connected to the second contact device, c) removal of the old wires from the existing wire connecting strip device, d) connection of the new wires in the existing wire connecting strip device, e) detachment of the second contact device from the incoming and outgoing wires and, optionally, f) repetition of the process steps b) to e) on further incoming or outgoing wires without changing the temporary wires or, g) detachment of the first contact device from the new wires in order to complete the changeover process.

A preferred inventive development of the process is distinguished by process steps to be undertaken at both splice points and on the remaining or reusable AVL: connection of undisturbed, temporary wires to a new wire connecting strip device (AVL), connection of the first contact device to the wire connecting strip device in order to produce the contact with the temporary wires, connection of the second contact device to an existing wire connecting strip device for the incoming or outgoing wires in order to produce the contact, removal of the old wires from the existing wire connecting strip device, as a result of which sufficient working supply is produced on the remaining AVL to insert into a splicing comb, connection of the now wires in the existing wire connecting strip device, detachment of the changeover device from the existing wire connecting strip device and, optionally, repetition of the process steps without changing the temporary wires or detachment of the changeover device from the new wire connecting strip.

The inventive working process can be applied to sleeves which already have a connected wire connecting strip on the telecommunications cable. According to the invention, the sleeve jacket and the sleeve head of the cable which is no longer necessary are removed and the new cable is prepared.

The first step in the process, namely the provision or the connection of a new wire connecting strip, can also be dispensed with if in particular a telecommunications cable is present which already has an AVL, that is to say a wire connecting strip device connected to the respective wires or is intended to be connected without an AVL.

In the main cable section, the inventive process has the advantage that the sleeve head on the remaining cable or all the other components of the sleeve for closing the sleeve can be re-used. In the branch cable section, the shrunk-on sleeve cannot be re-used.

Overall, the inventive process, in conjunction with the inventive changeover device, offers the following advantages. The wire connecting strips present at the connecting points (splice points) are re-used. No corresponding waste is produced. During the changeover, no AVL U is necessary, since the wire connecting strips (AVL) already present can be employed for this changeover. Furthermore, it is of advantage that, in the event of a taut cable or wire guidance, setting back is dispensed with and hence the very complicated and labor-intensive lengthening of the wires by means of the DVA U or AAKv (UPB) is dispensed with. Furthermore, in the case of sleeves in the main cable section, only the sleeve head needs to be produced on the new cable, the remaining sleeve parts can be re-used. In some cases, the sleeve is located rather close to the edge of the cable duct. Setting back (as in the case of the process used at present) would mean that the new sleeve would be located too close to the outgoing or incoming tube conduits within the cable duct. The consequence is that the new cable to be drawn in has to be laid one duct length further. In the case of the inventive process, this risk does not occur. The sleeve remains at the same point. Furthermore, according to the invention the advantage is offered that the working processes during splicing in the new cable are significantly simplified, since setting back is not required in any case in order to obtain a supply loop to be inserted into the AVL U or AVL.

With regard to the costs, the following advantages may be achieved by means of the inventive process. At a connecting point, the employment of a known AVL U and of another AVL at the other point are no longer needed, since connections are made to the AVL already present. Furthermore, about 70–80% of the costs of a main cable sleeve are avoided, since the already existing main cable sleeve can for the most part be re-used. In the case of a taut cable guidance, the wires do not have to be lengthened using a DVA U or AAKv (UPB). This results in the very complicated work of lengthening being saved. In the case of a cable with about 1000 (twin) wires, this is about 40 working hours which can be saved per connecting point. In the extreme case, the drawing in of an additional cable as far as the next cable duct can be avoided, if the existing sleeve is located too close to the incoming or outgoing tube conduits.

Since the inventive process is significantly simpler to execute using the inventive changeover device, disturbances in the telecommunications cable can be eliminated distinctly more quickly, which is ultimately associated with advantages for the user, since the institutions charged with the elimination of disturbances can eliminate the disturbance significantly more quickly.

The inventive changeover device is characterized by a first contact device which can be brought into contact with temporary undisturbed wires and a second contact device which is in contact with the first contact device and which can be brought into contact with incoming or outgoing wires. An advantageous development is distinguished by the changeover device having a first contact device having contact elements and a second contact device, in contact with the first contact device and having contact elements, and the changeover device being designed in such a way that in the plugged-on state the contact elements which can be guided into the test openings in each case produce contact with the contact units of the respective wire connecting strip devices.

The contact elements are preferably designed as pin elements which are displaceable in the direction of their longitudinal axis and are elastically mounted. Satisfactory contact when the changeover device is plugged onto the wire connecting strip device can thereby be ensured. One particularly simple structural configuration is distinguished by the elastic mounting being implemented by means of the action of a spring element.

A changeover device which is suitable with regard to the rough stressing in practice during daily operation is distinguished by the fact that the contact elements are in each case longitudinally displaceably mounted in a hollow profile, this hollow profile avoiding damage to the contact elements, since it has a very high stiffness in combination with a high resistance to wear, so that it can be ensured that the plug-on process of the switchover device can be carried out at any time without problems. Damage to or bending of the contact elements is thereby avoided to the greatest possible extent and a permanent and reliable functioning of the changeover device is ensured.

In order to ensure satisfactory contacting during the uninterrupted changeover procedure, it has proved to be favorable to provide a locking device which grips the wire connecting strip device preferably from above and/or below and/or from the side. The gripping or the arrangement of the locking device is selected in such a way here that the exchange of the old wires to be replaced during the process is not impeded and, at the same time, the wire connecting strips can be inserted, with the changeover device, into existing, known splicing combs without the operation of splicing in the new wires being impeded.

A compact embodiment of the inventive changeover device is distinguished by the fact that the first contact device and the second contact device are present in one housing. Furthermore, it may be favorable to provide a changeover device in which a separation of the first and second contact device in each case in a separate housing is carried out, the conductive connection between the first and second contact device being able to be ensured by means of a flexible cable arranged between them.

With regard to manipulability during the production of the conductive connections of the new wires to be inserted, it has proven to be beneficial to provide on the changeover device a positional fixing device which can be used for the temporary detachable fixing of the newly inserted wires, said positional fixing device preferably being designed as a spiral wire spring.

A preferred refinement of the inventive changeover device is distinguished by the first or second contact device having 20, 40 or 50 contact elements or a multiple of the above-mentioned values.

Figure 17:
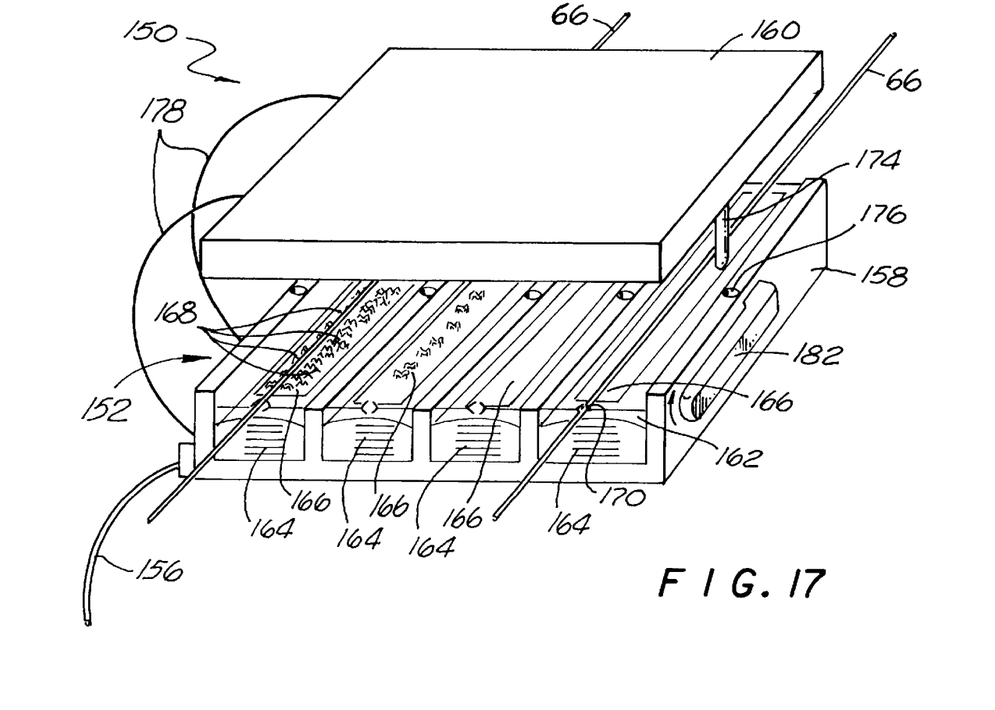
FIG. 17 shows a schematic perspective representation of a contact device having contact surfaces.

A particularly preferred development of the inventive changeover device, which also enables a possible use in the case of extremely tautly tensioned wires, is distinguished by the first contact device and/or the second contact device having penetration elements which produce a contact by means of penetrating the insulating sheath of the respective wire (FIG. 17).

In this case it has also proven to be directly beneficial to design the changeover device such that the first and/or second contact device has a contact surface with many contact tips, onto which the wires can be pressed once more, in each case in a fixed manner.

In order to ensure a permanent production of contact, it has also proven to be beneficial to design the contact surface to be elastically mounted, a rubber cushion or spring elements being preferably employed.

With regard to the production of the contact surfaces in order to guarantee a satisfactory contact, it is particularly advantageous to design the contact tips by means of stamped-out crater tips, which on the one hand enables simple and logical production and on the other hand enables reliable contact to be made during the temporary contacting procedure.

It is particularly advantageous to design the contact surfaces to be detachably fastenable to the contact device, in order that, given unavoidable wear phenomena, the use of the contact devices, that is to say of the changeover devices, can be ensured by means of a simple exchange of the contact surfaces.

In a further inventive refinement, the changeover device, that is to say the first and/or second contact device has contact elements which are present in a grid form, and onto which a wire connecting strip device can be plugged in a contacting manner. In this arrangement, the contact elements are preferably designed as rod elements which can be brought into engagement with the contact elements of the wire connecting strip device. Use is preferably made here of a wire connecting strip device which has no blade elements on its plug-in side, which strip is designated here as AVL U. With the AVL U strip plugged on, it is thus possible for arbitrarily many new wires to be drawn in on the upper side of the AVL U and contacted, depending on which wires just have to be contacted or connected.

Further embodiments and advantages of the invention emerge from the features further listed in the claims, as well as from the exemplary embodiment indicated below. The features of the claims can be combined with one another in any desired way, to the extent that they are not obviously mutually exclusive.

BRIEF DESCRIPTION OF THE DRAWING

The invention, and advantageous embodiments and developments of the same, are described and explained below with reference to the example represented in the drawing. The features to be gathered from the description and the drawing can be used individually and independently or in a plurality in any desired combination, according the invention. In the drawing.

DESCRIPTION OF THE PREFERRED EMBODIMENTS

Figure 1:
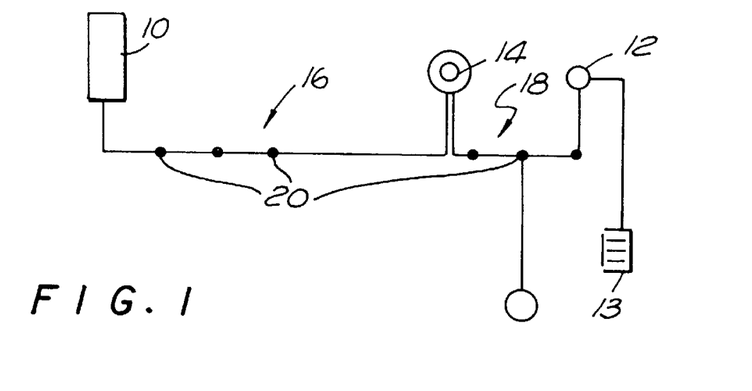
FIG. 1 shows a schematic representation of the connecting situation between the telecommunications exchange and subscriber.

FIG. 1 shows in schematic form a connecting path from a telecommunications exchange 10 to a household connection (APL) 12 or to a subscriber unit 13. Connected between the telecommunications exchange 10 and the subscriber unit 13 is a distributor unit 14 and a cable terminal point (APL) 12, the main cable section 16 being to the left of the distributor unit 14 and the branch cable section 18 being to the right of the distributor unit 14. In the main cable section 16 there are individual connection sleeves 20 within which the telecommunications cables are connected. There are also such connection sleeves in the branch cable section 18 (not shown).

Figure 2:
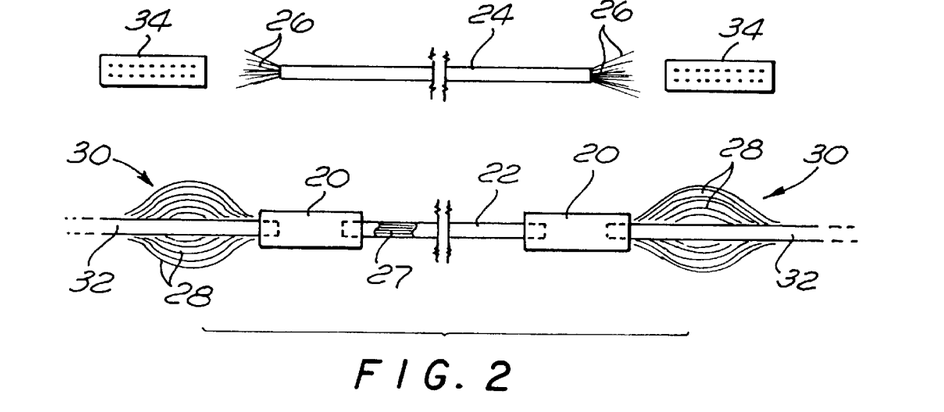
FIG. 2 shows a schematic representation of the changeover situation according to the known process.

FIG. 2 shows the situation when changing over from a telecommunications cable 22 which is to be exchanged and has wires 27 to a new telecommunications cable 24, which has already been laid in a cable duct in the section between the respective connection sleeves 20, and whose wires 26 have to be connected to the wires 28 of the cable sections adjoining the respective connection sleeve 20. In a sleeve 20 there are as a rule a multiplicity of known wire connecting strip devices which in each case electrically connect a predetermined number of conductive connections between the incoming and outgoing wires.

According to the known process, the wires 28 of the respectively incoming telecommunications cable 32 are pulled apart in the respective connection sleeve 20 in a supply loop 30. The wires 28 which have been pulled apart are then inserted into known wire connecting strip devices 34 and brought into electrically conductive contact with first contact devices 36 of the strip of the known wire connecting strip devices 34. Then, the wires 26 of the new telecommunications cable are inserted into the wire connecting strip device 34 and brought into electrically conductive contact with the wires 28. In this case, use is made in a connection sleeve 20 of wire connecting strip devices which also ensure an uninterrupted through passage (AVL U) of the existing wires. As soon as the connection has been produced by the wire connecting strip device 34, the old telecommunications cable 22 can be exchanged or the wires of the latter can be cut off, the wire connecting strip devices and sleeves present on the old cable becoming waste, since they are not re-used.

Figure 3:
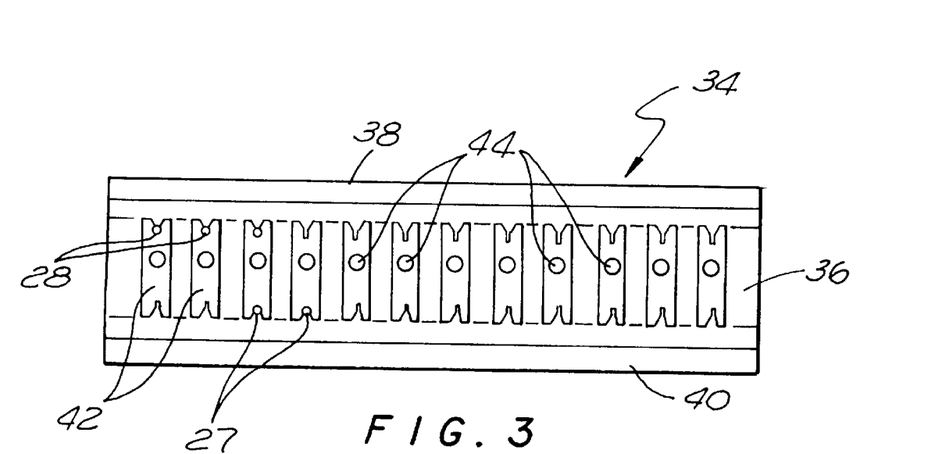
FIG. 3 shows the schematic construction of a known wire connecting strip device using the adaptor device according to the invention.
Figure 4:
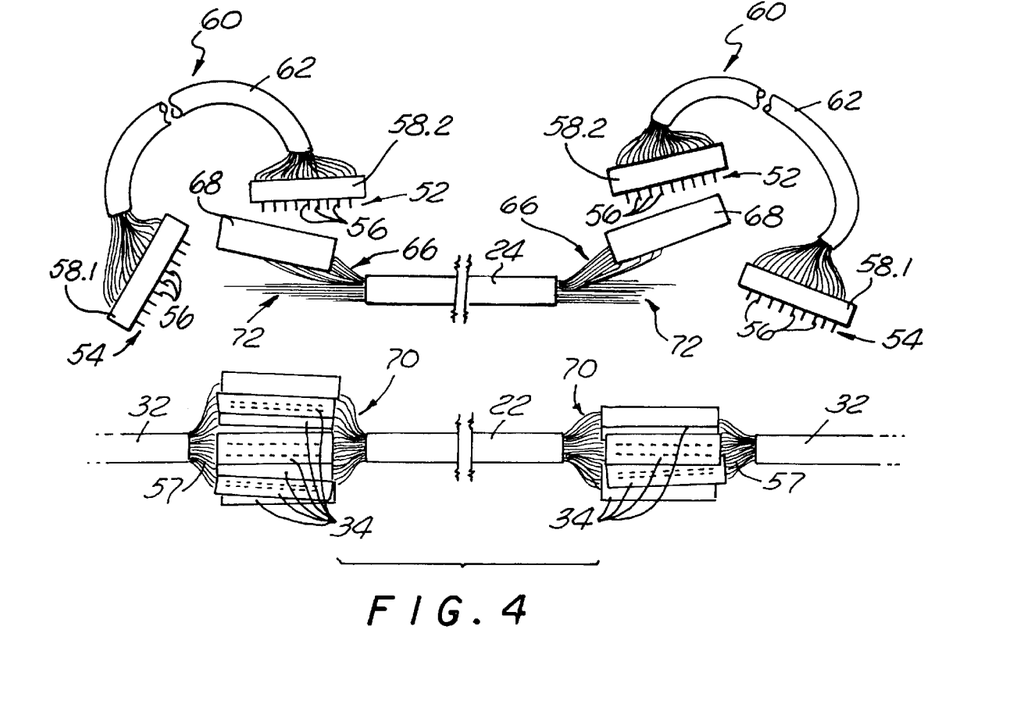
FIGS. 4 to 7 show schematic representations of the process for the uninterrupted changeover using a changeover device according to the invention.
Figure 5:
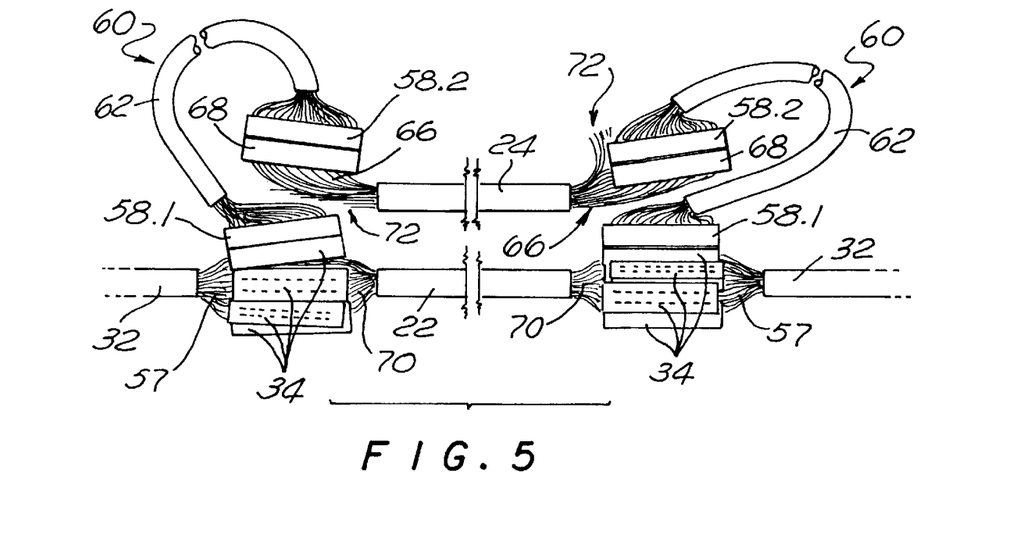
Figures 6, 7, 7B:
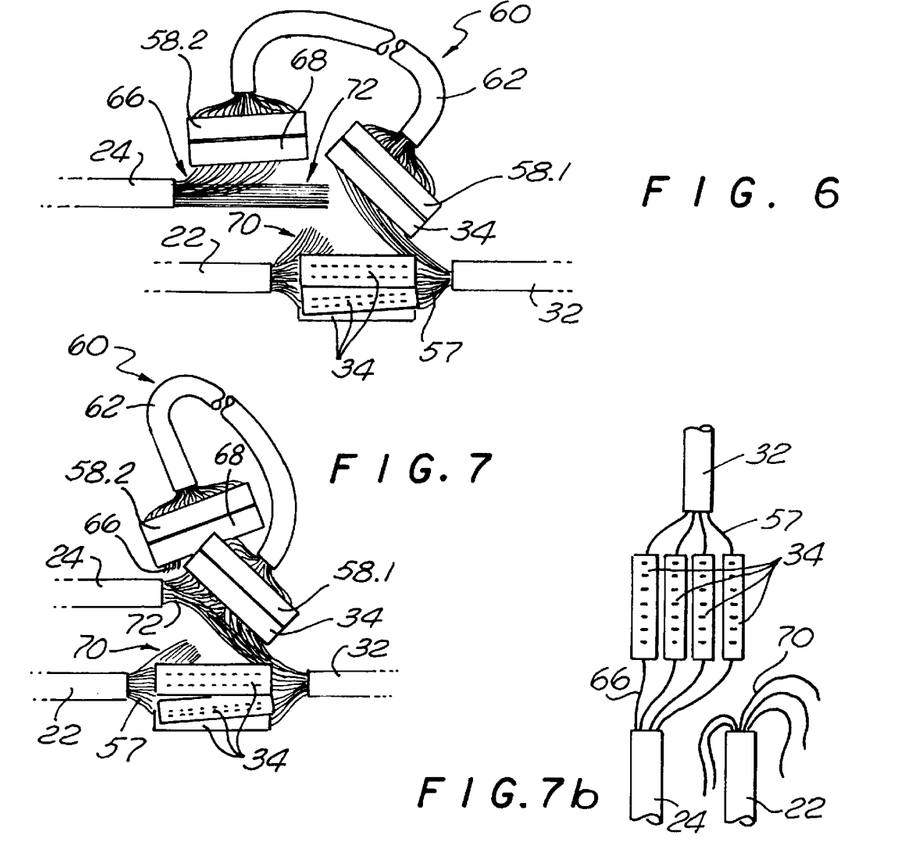
FIGS. 7a, 7b show schematic representations of the process in an overview in detail.
Figure 10:
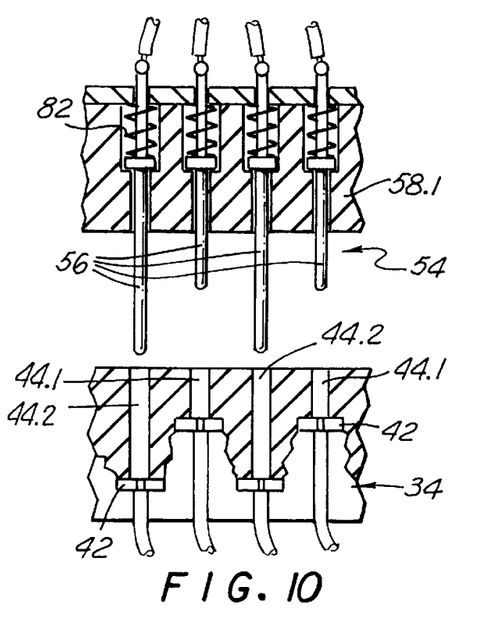
FIG. 10 shows a schematic sectional representation of the changeover device and of the wire connecting strip device according to the arrangement of FIG. 8.

According to FIG. 3, a known wire connecting strip device 34 consists of a centrally arranged wire connecting strip 36 and a cover unit 38, which is present on the upper side, and a base unit 40 which is present on the lower side. The wire connecting strip 36 has, per wire to be connected, a first contact device 42, to which the wires 28 of the incoming telecommunications cable 32 may be electrically conductively connected and, at the same time, the wires of the telecommunications cable 22 to be exchanged are electrically conductively connected. The wire connecting strip 36 has, for each contact unit 42, test openings 44, through which the contact units 42 are accessible point by point from the outside. The contact units 42 are present offset from one another, seen in the longitudinal direction, with the result that there are test openings 44.1 and 44.2 with different lengths (see FIG. 10).

Figure 9:
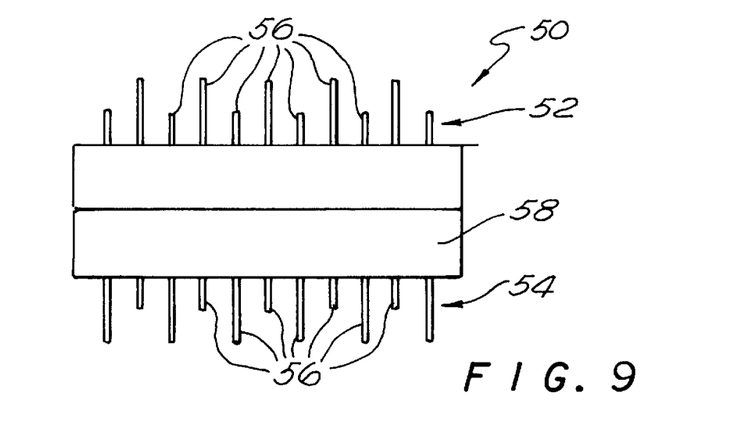
FIG. 9 shows a schematic detailed top view of a changeover device with a single housing.

A first form of a changeover device 50 according to the invention is represented schematically in FIG. 9 as a detail extract. The changeover device 50 has a first contact device 52 and a second contact device 54 which is in conductive contact with the first contact device 52, the contact devices having in each case contact elements 56 which are arranged on the same grid dimensions as the test openings 44 of the wire connecting strip 36. The two contact devices 52, 54 are accommodated in a common housing 58.

The length of the contact elements 56, which are designed as contact pins, essentially corresponds to the length of the respectively associated test opening 44, these contact elements being longitudinally displaceably mounted and, when plugged in, are resiliently pressed against the contact units 42, which is described further below.

The use of a second changeover device 60 according to the invention within the context of the process according to the invention for the uninterrupted changeover is represented in FIGS. 4 to 7, 7a and 7b. A detail of this changeover device 60 is shown in perspective view in FIG. 8.

Figure 8:
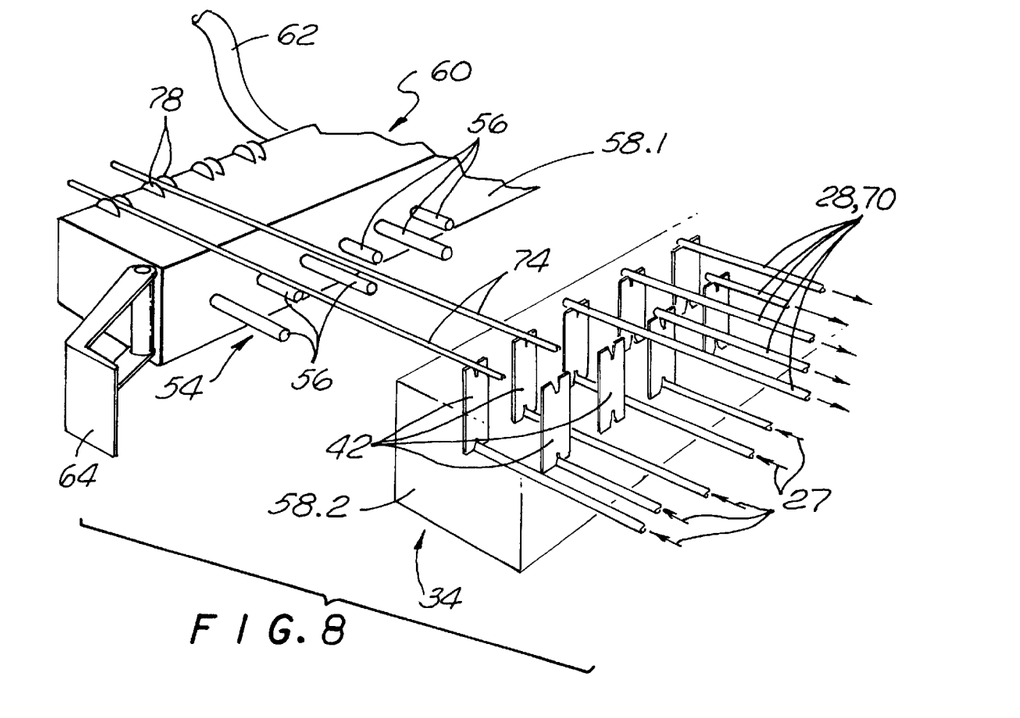
FIG. 8 shows schematic perspective details of a changeover device and of a wire connecting strip device in a partly cut-open state.

In the case of the changeover device 60, the contact devices 52 and 54, together with their contact elements 56, are in each case arranged in a separate housing 58.1, 58.2, the conductive connection between the two contact devices 52, 54 being ensured by a flexible cable 62 connected between them.

Represented schematically in FIG. 8 is further a clamping device 64 which is present on the side wall, by which means positional securing of the changeover device is intended to be ensured in the state when it is plugged onto the wire connecting strip device 34. This clamping device 64 may also be designed in another way in terms of its structure. In the design of the clamping device it is important that this does not impede the mounting of the wires during the changeover process and at the same time the wire connecting strip device 34 with the plugged-on changeover device 60 can be inserted into known splicing combs.

The number of contact elements 56 per changeover device per contact device depends on the number of contact units of the respective wire connecting strip device to be changed over. Preferably, changeover devices with ten, twenty, forty or fifty contact elements are used.

The process according to the invention for the uninterrupted changeover is now explained below with reference to the schematic representations in FIGS. 4 to 7, 7a+7b.

The respective process steps are to be carried out synchronously in the respective splice point of the now telecommunications cable 24 and telecommunications cable 22 to be exchanged. Coordination between the mounting personnel can be carried out, for example, via cable wire test devices. The temporary changeover wires are maintained until the work is completed.

The starting situation is that in which the incoming or outgoing wires 57 of the telecommunications cable 32 are to be connected to the wires 66 of the new telecommunications cable 24, that is to say the old wires 70 of the old telecommunications cable 22 are intended to be replaced, without any interruption occurring.

After the sleeve has been opened at both splice points, the wire connecting strip devices 34 are accessible from outside. The wires 66 of the new telecommunications cable 24 which is to be connected, which wires 66 are called temporary wires below, are connected in a known manner to a wire connecting strip device (AVL) 68, in that the base or cover unit is removed, the wires 66 are inserted and subsequently the cover or base unit is once more pressed onto the wire connecting strip 68, as a result of which the wires 66 come into contact with the contact units 42 of the wire connecting strip device 68.

The starting situation has now been reached in which the changeover device 60 according to the invention comes into use. The first contact device 52 is plugged onto the AVL 68. Furthermore, the second contact device 54 is plugged onto the AVL 34, to which the wires 70 which are to be exchanged—called the old wires below—are connected. When this has been done at both splice points of the telecommunications cable 24 and 22, two triangular circuits are present and the telephone traffic can proceed without problems via the newly connected temporary wires 66.

The cover unit or base unit of the wire connecting strip device 34 is then detached and the old wires 70 are removed. The wires 72 which are to be newly connected are then connected to the wire connecting strip 34 in a known way, the connection normally being carried out in a splicing comb with subsequent pressing of the base or cover unit onto the wire connecting strip 34.

Following the connection of the new wires 72, the second contact device 54 can be drawn off from the wire connecting strip 34 and a connection is produced between the incoming or outgoing wires 57 and the new wires 72 of the new telecommunications cable 24. During the process, no interruption of the connection of the wires takes place at any point. Then, after the first wire connecting strip 34 is connected to the new wires 72, the remaining wire connecting strips 34 can be connected in the same manner to the wires to be newly connected of the new telecommunications cable 24.

The precondition for the uninterrupted changeover is that the mounting personnel in each case always connect and, respectively, detach the same temporary wires, old wires and new wires.

The process according to the invention can be used not only to connect the wires of new telecommunications cable without interruption, but also to "shift" the individual wires within one telecommunications cable, that is to say to change over any disturbed or damaged wires without interruption to undisturbed wires within the same telecommunications cable.

In order to ensure the positional fixing of the individual wires during the connection, with the changeover device plugged on, the changeover device 60 according to FIG. 8 has, for each wire, a pair of clamping jaws 78 in which the individual wire can be detachably clamped during the mounting process.

In order to ensure reliable contacting of the contact elements 56 with the contact units 42 when the changeover device 50 or 60 is plugged on, the contact pins 56 are mounted such that they can be displaced in the direction of their longitudinal axis 80 and are simultaneously subject to the action of an elastic element, in particular of a spring 82. One possible construction for the resiliently longitudinally mounted contact pins 56 is represented schematically in FIG. 11.

Figure 11:
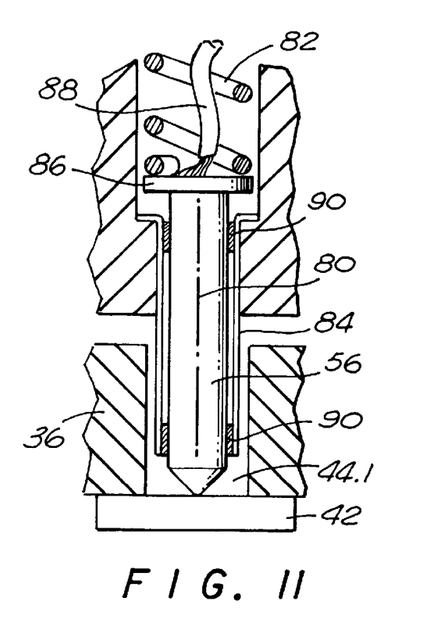
FIG. 11 shows a schematic detailed sectional representation of a contact element which is mounted resiliently and longitudinally displaceably.
Figure 12:
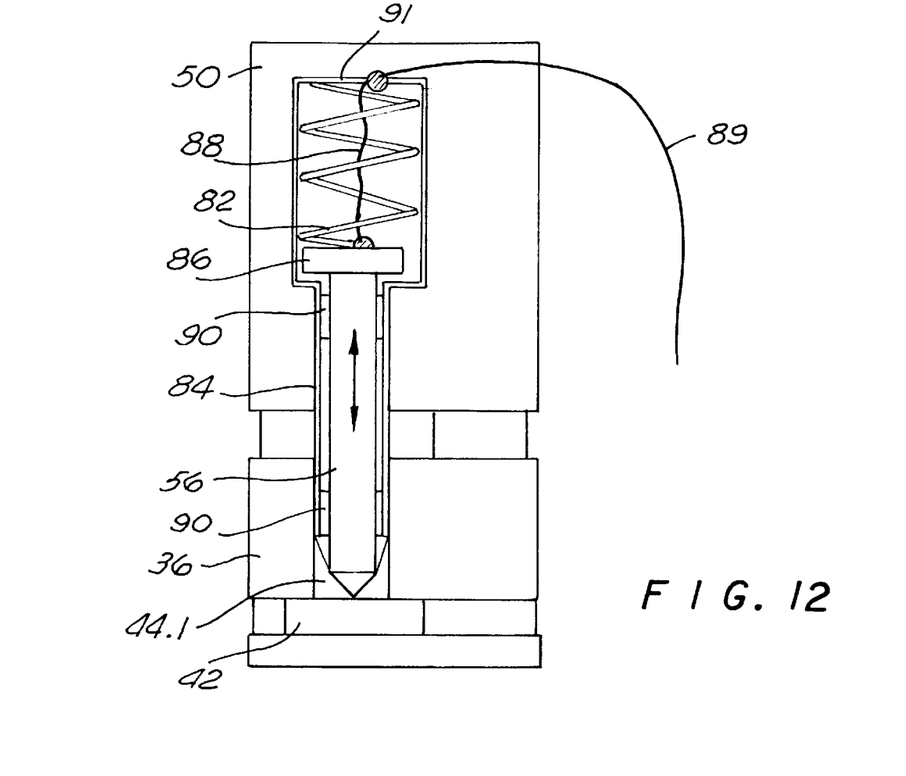
FIG. 12 shows a schematic overall sectional representation of a contact element which is mounted resiliently and longitudinally displaceably.

The contact element 56 is longitudinally displaceably guided in a sleeve 84, which is designed as a hollow profile, preferably from Kevlar. The contact element 56 projects only slightly beyond the front end section of the sleeve 84. In the rearward end section of the contact element 56, an end plate 86, on which the spring 82 acts, is molded on. At the same time, a line 88 is connected to the end plate 86. The one conductive connection to the contact device or to the contact element on the other contact side is ensured by means of the connection of a cable 89 having wires to the line 88, the connection point also being contacted via an end plate 91 of the spring 82 (see FIG. 12).

Arranged in the front and rear end section of the sleeve 84 are bearing units 90, preferably made of Teflon, which ensure satisfactory longitudinal displaceability of the contact element 56.

The sleeve 84 serves primarily to protect the contact element 56 from damage during the rough mounting operation and prevent the contact element 56 deviating from the longitudinal axial direction 90.

Figure 13:
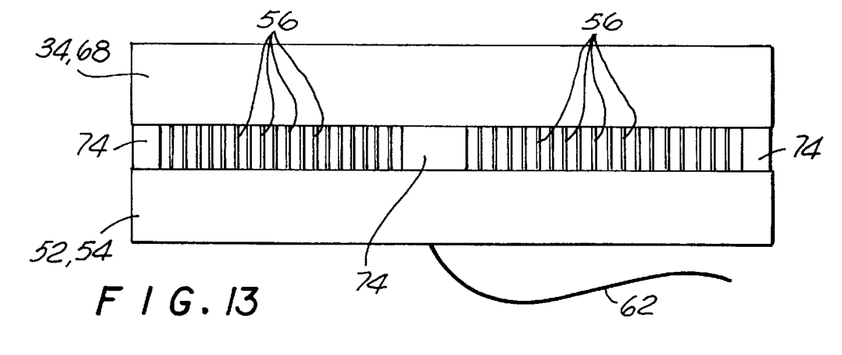
FIG. 13 shows a schematic top view of a contact device placed on an AVL, FIG. 14 on an schematic section through a splicing comb with an inserted AVL with contact device.

Represented schematically in FIG. 13 is a top view in which a contact device 52, 54 has been plugged onto a wire connecting strip device 34, 68. Arranged between the contact unit and the wire connecting strip device, in the center and in the edge region, are spacers 74, which are preferably molded onto the contact device.

Figure 14:
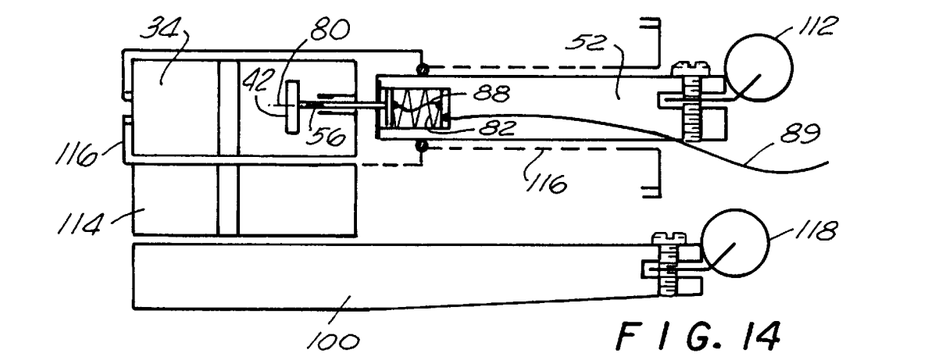

Represented schematically in FIG. 14 is a section through a splicing comb 100 with the wire connecting strip device 34 inserted with the contact device 52 plugged in. Here, two cases should be distinguished. If the old wires to be disposed of lie at the bottom (in the base region), the level is equalized over the entire AVL, so that the latter can be inserted simply into a splicing comb 100, with the result that the pressure during the contacting takes place uniformly over the entire AVL 34. Locking is effected via rotatable locking elements 110, which are turned over in the region of the center, the left and the right edge section of the AVL 34 and snap in on the AVL in a locking manner. In this state, the new twin wires to be inserted can be inserted without problems into the AVL 34 and can be locked by means of the locking device, designed as a spiral spring 112.

In order to provide space for the lower locking element 116, which is not used, there is a spacer 114 between the AVL 34 and the splicing comb 100.

When the old twin wires which are to be disposed of lie at the top (in the cover region), the locking elements 116 are used to fix the contact device 52 temporarily to the wire connecting strip 34. The locking elements 116 are in principle designed identically to the locking elements 110. When it is inserted in the splicing comb 100, the AVL rests on over its entire lower surface, so that for this case, too, uniform contact pressure can be produced for contacting the twin wires. The new twin wires are then inserted into the base part 40 inserted into the splicing comb and are fixed on the splicing comb 100 by means of the wire locking means, designed as a spiral spring 118, and contacted by being pressed. When contact has been made at both splice points of the telecommunications cable 24 and 22, two triangular circuits are present and a start can then be made on exchanging the old wires.

Figure 15:
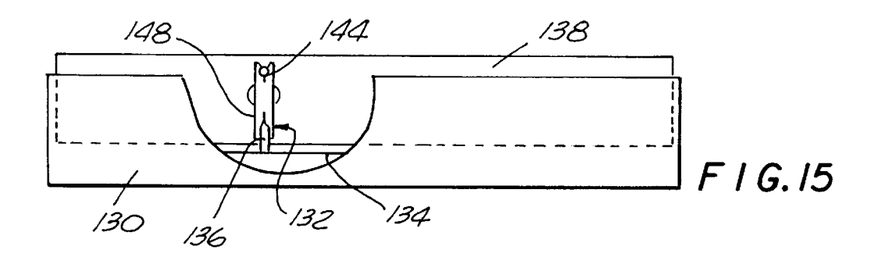
FIGS. 15, 16, show a further exemplary embodiment of a contact device in a detailed sectional front view and in longitudinal section.
Figure 16:
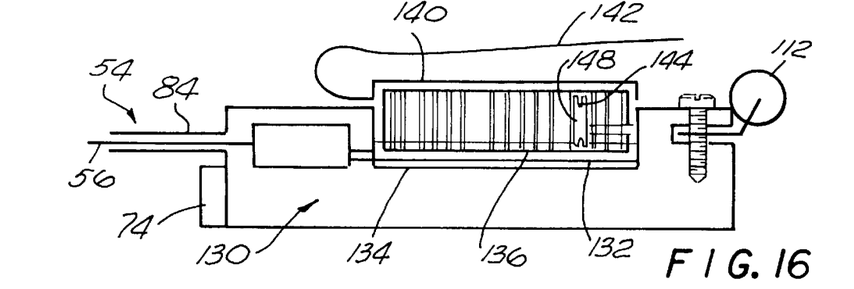

Represented schematically in FIGS. 15 and 16 is a further variant of a changeover device 130 according to the invention. The first contact device 54 is designed exactly as the first contact device of the previously described changeover devices and will then therefore not be described and explained again at this point. Identical components carry the same reference symbol.

The changeover device 130 has a recess 134 in which there is a second contact device 132. The second contact device 132 comprises contact units 136 which extend over the entire width of the recess 134 at the bottom and each of which is in electrically conductive connection with the contact elements 56 of the first contact device 54. In this case, the contact elements 136 are arranged at such a grid spacing that it is possible to insert a wire connecting strip device 138 which contains no blade elements (AVL U) on its lower side. As a result, the contact elements of this AVL U are contacted by the contact elements 136. If the cover unit 140 is removed from the AVL U 138, any number of connections can be produced via twin wires 142 laid on at the top.

Figure 7A:
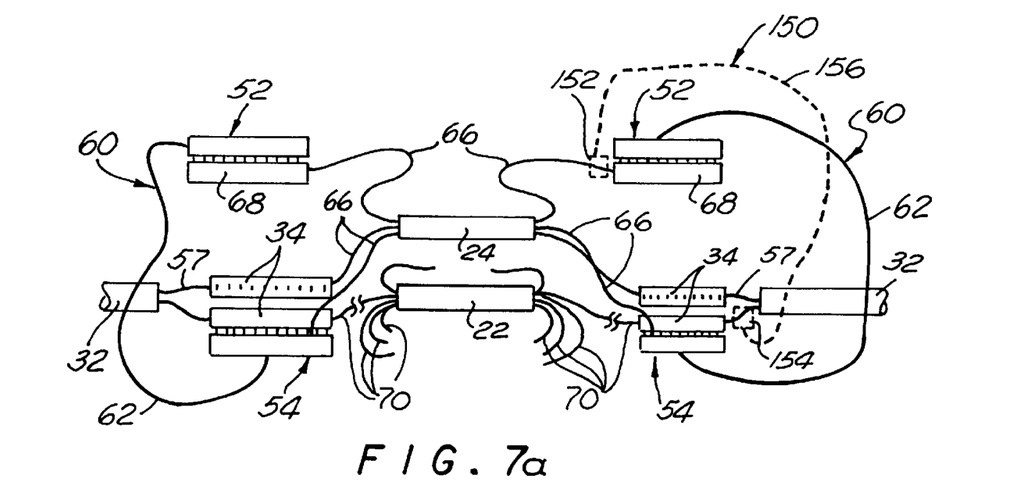

Represented schematically with dashed lines in FIG. 7a is a further design variant of a changeover plug-in device 150 according to the invention. This has a first contact device 152, a second contact device 154 and a connecting cable 156 producing a conductive connection between the contact devices. The contact devices themselves are in direct contact with the respective individual wires, in that electrically conductive components penetrate into the insulating sheath in each case surrounding the wires, and thus produce the contact.

Figure 20:
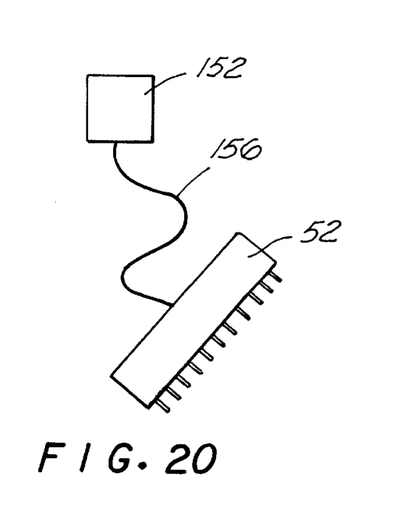
FIG. 20 shows a schematic representation of a changeover device having a contact device according to FIG. 17 and a contact device according to FIG. 4

Contact devices 152, 154 of this type can also be employed in conjunction with the contact devices 52, 54 in a changeover device which is represented schematically in FIG. 20.

Figure 18:
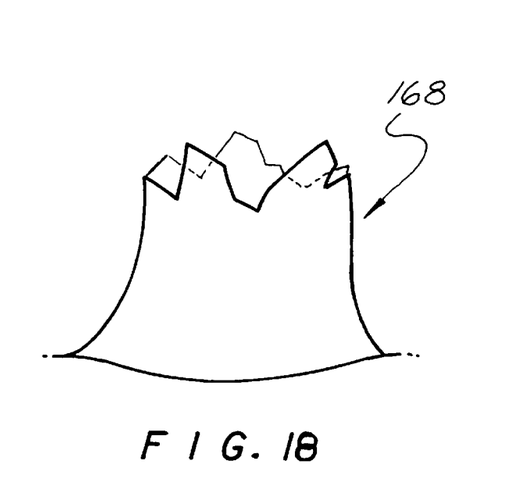
FIG. 18 shows a schematic perspective representation of a contact crater.
Figure 19:
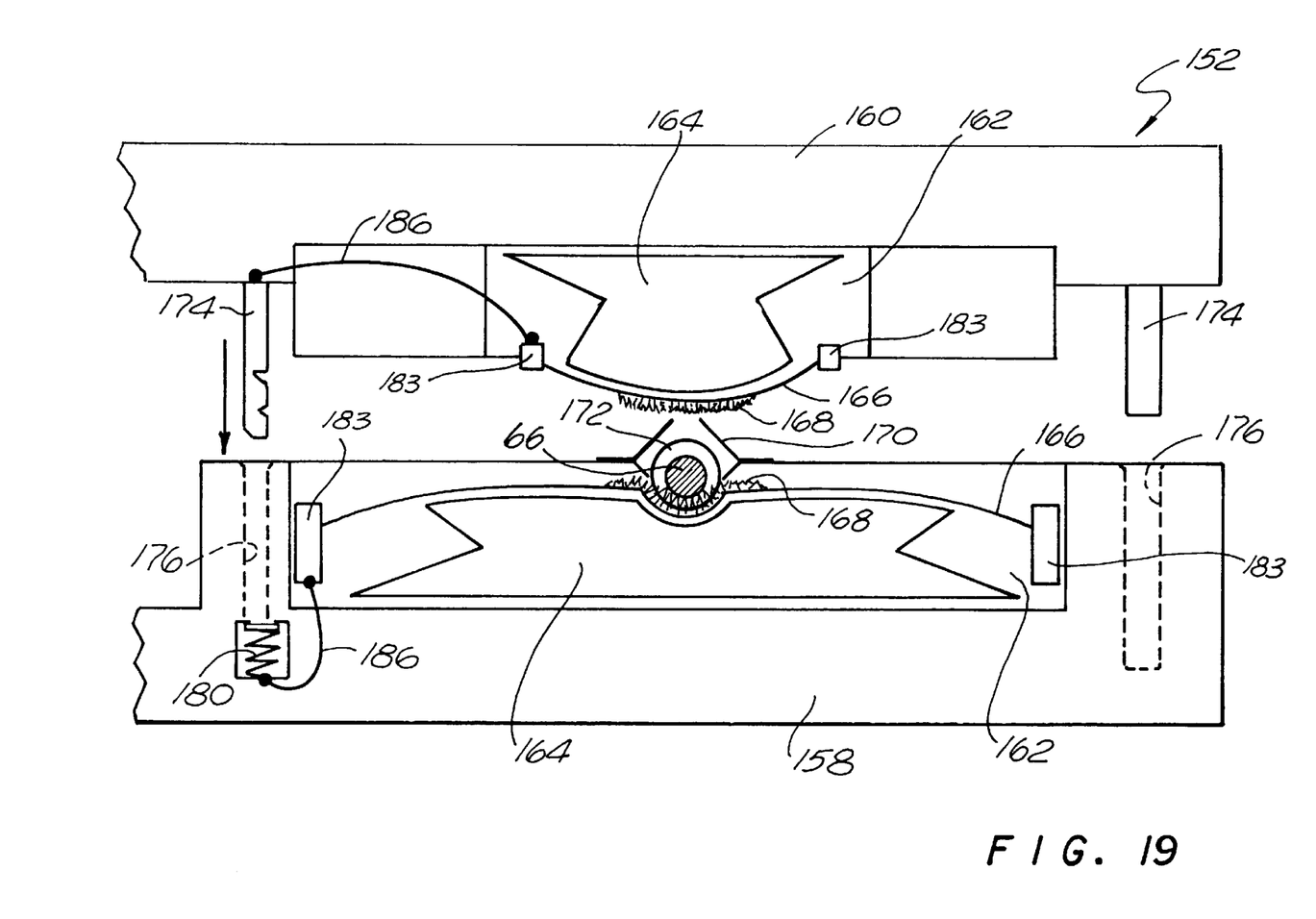
FIG. 19 shows a schematic sectional representation of the contact device according to FIG. 17.

FIG. 17 represents a schematic detail perspective of a contact device 152. The contact device 152 has a base unit 158 and a cover unit 160. Both the cover unit 160 and the base unit 158 have recesses 162, which extend in the longitudinal direction and within which elastic elements 164 are arranged which act on contact surfaces 166 in each case present within the recess 162. The contact surfaces 166 have contact craters 168 (FIG. 18) which are stamped out and point to the outside, which are present distributed over the area of the contact surface 166 and which can be produced in a simple way by stamping. There is in each case a total of 4 recesses 162 with contact surfaces 166. The contact surface may also be present only on the cover or base side.

The production of the contact with the individual wires 66 then takes place as follows. Firstly, each wire 66 is first introduced into the respective recess 162 onto the corresponding contact surface 166. Wire traps 170, which are present at the end, facilitate the insertion process. As soon as all the wires 66 have been inserted into the four recesses 162 and are fixed, the cover unit 160 is pressed onto the base unit 158. By this means, the respective wire 66 is pressed between the respective contact surfaces 166, as a result of which the contact craters 168 penetrate the insulating layer 172 of the wire 66 and come into contact with the conductive material of the wire 66. Molded onto the cover unit 160 are guide units 174 which, during the process of placing on, are guided in appropriate recesses 176 which are present on the base unit 158.

The cover unit 160 is connected to the base unit 158 via flexible tapes 178.

Specific guide units 174 are designed as cover traps which, during the pressing-on process of the cover unit 160 onto the base unit 158, lock in two stages in a detachably lockable manner into interlocking tabs present in the recesses 176. These cover traps are displaced counter to the action of a spring 180 during the pressing-on.

As soon as the changeover process has been completed, the locking connection of the cover traps is detached, which can be carried out, for example, via a rotary lever 182, the base unit 158 automatically moves away from the cover unit 160, as a result of which the contact connection is detached and the contact device can be removed. The tips of the crater 168 are so small, as a result of their fine structure, that the penetration regions of the elastic insulating sheath 172 close up once more after the detachment of the wires 66 from the contact surfaces 166, and virtually no severely damaging injury remains to the insulating layer.

The contact surfaces 166 are-arranged detachably in the recesses 162, so that they can be exchanged at any time, if the contact craters 168 have achieved a certain degree of bluntness and trouble-free penetration of the insulating layers can no longer be guaranteed. The contact surfaces 166 are electrically conductively led to the outside via connecting wires 186, which are collected in a common cable 156. Here, in the exemplary embodiment it is the case that, in the case of the lower contact surface 166, electrical contact is initially achieved via the bearing construction 182 of the contact surface 166 to which the connecting wire 186 is connected. The connecting wire 186 is furthermore connected to the metallic spiral compression spring 180, which is electrically conductively connected to the cover trap 184 when the base unit is plugged in. The contact surface 166 of the cover unit 160 is also conductively connected to this cover trap 184. This contact point is led to the outside in a conductive manner in the connecting cable 186.

In the exemplary embodiment represented, the contact device 152 has four contact connection possibilities for four wires 66. The number of wires to be connected can be increased without problems. This depends on the respective case and is determined by prescribed conditions.

Using the changeover device according to the invention, it is possible in a simple way to produce electrically conductive contact to wires, in that the latter are merely laid in a simple way into the contact devices and these are pressed onto each other using their base and cover units. As a result of the contact surfaces being provided with craters, trouble-free contacting is ensured. Using contact devices of this type it is possible to produce a contact in the case of extremely tautly laid cables, without supply loops having to be produced. In addition, the changeover plug-in device according to the invention can be used in the case in which wires within a tautly guided telecommunications cable are themselves to be changed over, that is to say to be shifted. The teaching of the invention is not restricted to the changeover devices represented. On the basis of the inventive teaching represented, those skilled in the art will deduce a large number of constructional possibilities for designing changeover devices according to the invention.

Figure 24:
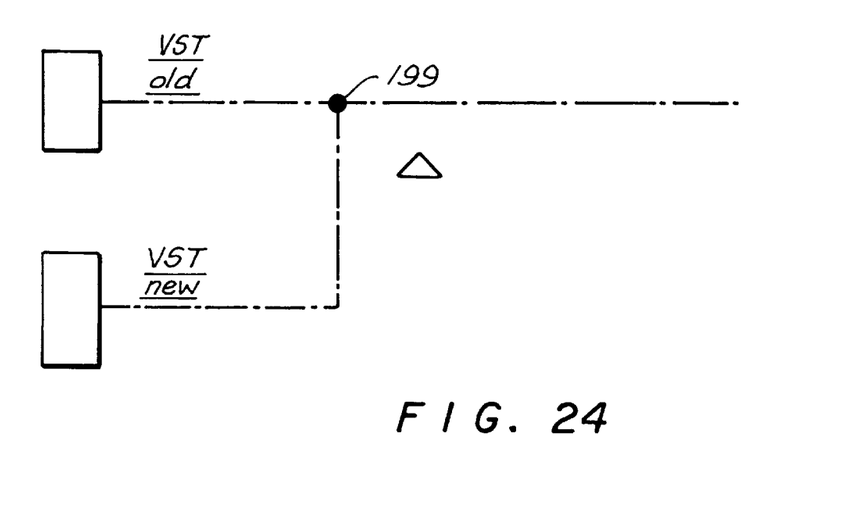
FIG. 24 shows a schematic extract from a network plan with a node splice which needs to be maintained over a relatively long period of time.

Represented schematically in FIG. 24 is an extract from a network plan which shows a node splice 199 which is not detached once more directly after its production, in the event that the triangular circuit is needed over a relatively long period of time. The sense of such a connection is in this case the substitute connection of a new switching center (VST) using the existing cable connections of an existing switching center. The changeover or switching in of a new switching center can take months. Only following the final commissioning of the new switching center is it possible for the node splice 199 to be detached. The node splice 199 must therefore be produced in a durable and safeguarded form (sleeve mounting).

Figure 21:
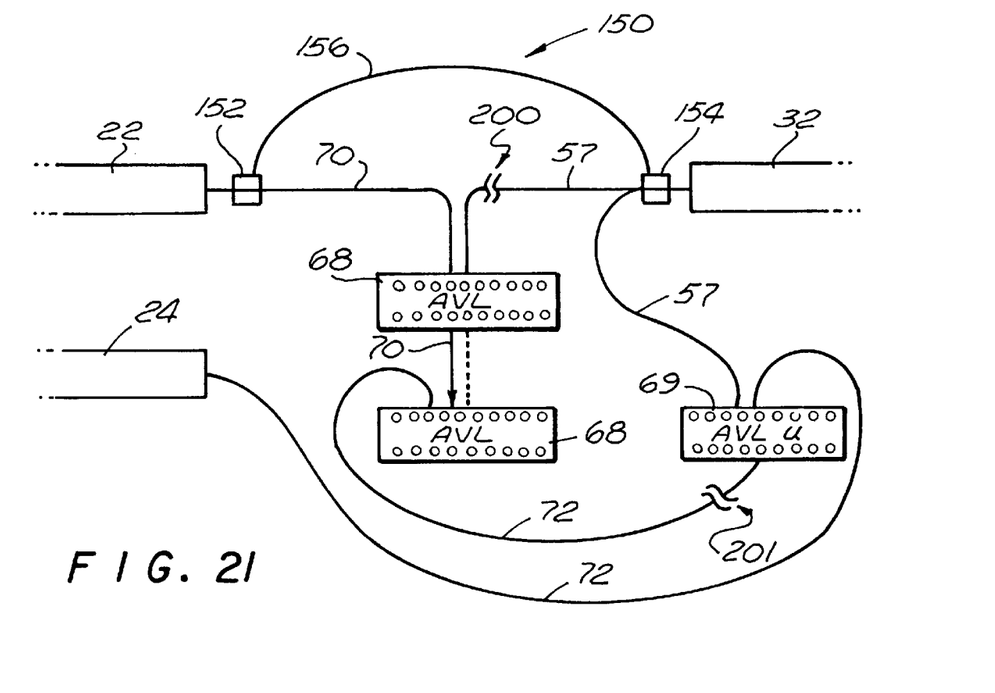
FIG. 21 shows a simplified schematic representation of a node splice which is not detached once more directly after its production, if there is an AVL.
Figure 22:
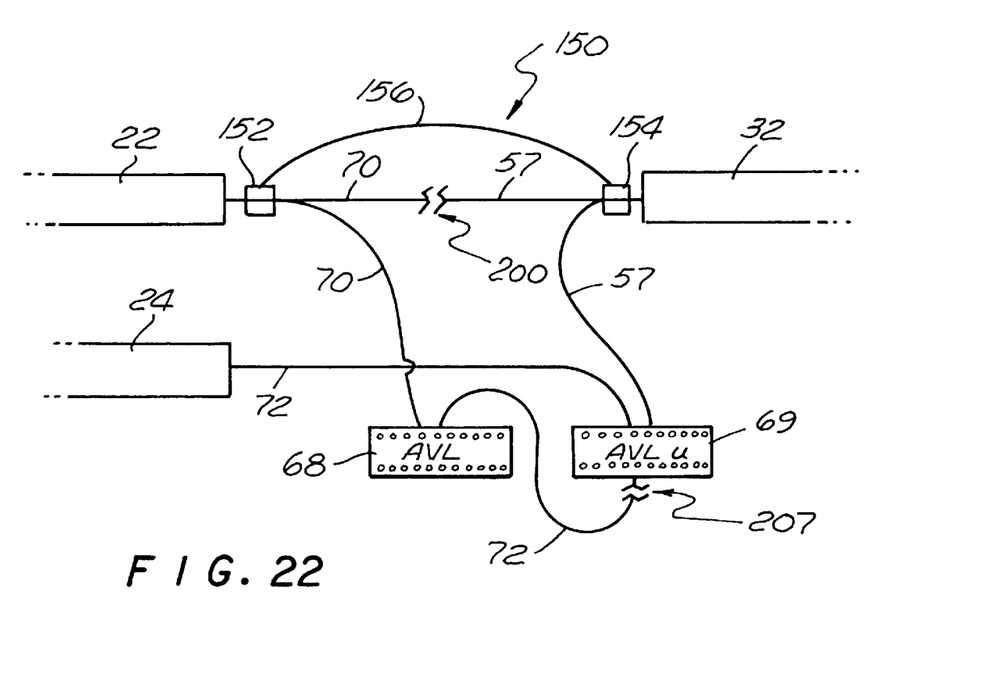
FIG. 22 shows a simplified schematic representation of a node splice which is not detached once more directly after its production, if there is a continuous cable.
Figure 23:
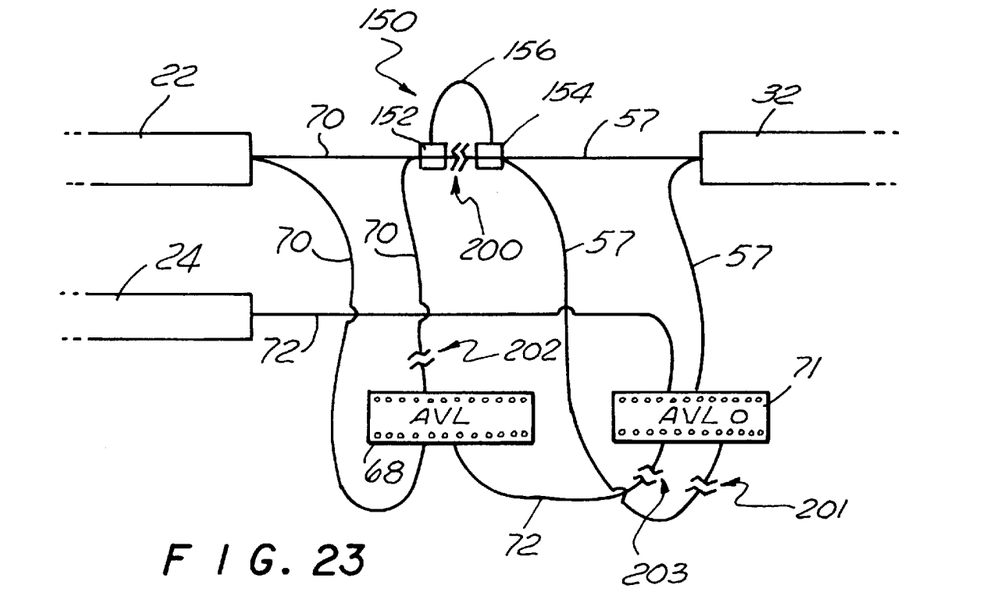
FIG. 23 shows a simplified schematic representation of a node splice which is not detached once more immediately after its production, with an AVL without a male connector device

Different processes for the production of the node splice 199 are indicated in FIGS. 21 to 23. For reasons of simplification, the representation is made only on one wire in the cable. In practice, this relates to a multiplicity of individual wires. Identical components bear the same reference symbols and will not be explained again.

According to FIG. 21, there is already a wire connecting strip device (AVL) 68 between an incoming cable 22 and an outgoing cable 32. The cable 22 is intended to be replaced for a long period by the cable 24. Firstly, the changeover plug-in device 150 with the first contact device 152 and the second contact device 154 is clamped in a contacting manner onto the wires 70 and 57 of the incoming cable 22 and outgoing cable 32 in the end section. A conductive connection is produced via the wire 156. Then, the wire (70, 57) running between the cables 22 and 32 can be severed at the point 200. The wire 57 of the outgoing cable 32 is then inserted into an AVL U 69 at the top. At the same time, the wire 72 of the new cable 24 is inserted into the AVL U 69 at the bottom. The wire 72 runs through the AVL U 69, without being severed when the AVL U 69 is pressed. A conductive connection is now produced between wire 72 and wire 57. Then, in the existing AVL 68, the wire 57 can be removed. The wire 72, running through the AVL U 69, of the new cable 24 is then inserted in its place. Following the pressing of the AVL 68, conductive contact is produced between the wires 70 and 72 and the changeover plug-in device 150 can be removed. A durable triangular circuit is now present in safeguarded form. In the event that the connection from the new cable 24 to the outgoing cable 32 is intended still to be maintained on its own, the wire 72 is severed at the point 201. Overall, an uninterrupted production of a node splice is thus ensured in a problem-free manner by means of the use of the changeover plug-in device 150 according to the invention.

In FIG. 22, the situation is such that there is no AVL present between the incoming cable 22 and outgoing cable 32. In a manner similar to that described above, the changeover plug-in device 150 is plugged in a contacting manner onto the wires 57 and 70. After being severed at the point 200, the wire 57 can be inserted into a AVL U 69 at the top. The wire 72 of the new cable 24 is inserted into the AVL U 69 at the bottom, runs through and is connected to a new AVL 68. At the same time, the wire 70 is connected to this AVL 68 and the AVL 68 is pressed, as a result of which conductive contact is produced between wires 70 and 72. The changeover plug-in device 150 can then be removed and once more there is a node splice which is durable and present in safeguarded form. If a changeover to the new cable 24 becomes definitive, the wire 72 has only to be severed at the point 201.

In FIG. 23, a cable running through (incoming cable 22 and outgoing cable 32) is likewise present. The changeover plug-in device 150 is plugged on in the central region between the wires 70 and 57. After being severed at the point 200, the wire 57 is inserted into an AVL 70 which has no male connector either at the top or at the bottom. At the same time, the wire 72 of the new cable 24 is inserted into the AVL 0 71 at the bottom so as to run through it. Following the pressing of the AVL O 71, the wires 57 and 72 run through the latter without interruption but conductively connected to each other. The wire 72 is inserted into the AVL 68 at the bottom. At the same time, the wire 70 is inserted into the AVL 68 at the top. By means of pressing the AVL 68, the wire 70 running between the changeover plug-in device 150 and the AVL 68 is severed in the AVL 68, which is represented symbolically in FIG. 23 by the cut 202. An electrically conductive connection is produced between wire 70 and wire 72. Then, the wire 57 is severed underneath the AVL O at the point 203. The changeover plug-in device 150 is then cut free. In this condition, there is a triangular circuit in a durable and safeguarded form. If the change-over is intended to be carried out merely on the cable 24 as a new cable going to the outgoing cable 32, the wire 57 is simply severed at the point 201. The use of an AVL O 71 which has no male connector makes it possible to configure the changeover process in such a way that, when the old cable is removed, the then still existing wires 72 and 57 have not been contacted by the changeover plug-in device 150 and can thus also exhibit no kind of mechanical damage.

If there is an AVL present between incoming cable 22 and outgoing cable 32, the procedure corresponds to the process of proceeding according to FIG. 21, with the use of an AVL O without a male connector.

I claim:

1. A process for the uninterrupted changeover of old wires to be exchanged of a telecommunications cable for undisturbed new wires of a telecommunications cable, the connection between incoming and outgoing wires of a telecommunications cable being carried out by a wire connecting strip device, within which the incoming and outgoing wires are connected to the old wires, which comprises process steps to be undertaken at both end regions of the old wires, using a changeover plug-in device having a first and second contact device the process comprising the steps of:
    a) effecting an electrically conductive connection of undisturbed, temporary wires to the first contact device,
    b) effecting an electrically conductive connection of the second contact device to the incoming and outgoing wires, the first contact device being electrically conductively connected to the second contact device;
    c) removing the old wires from the existing wire connecting strip device;
    d) connecting the new wires in the existing wire connecting strip device;
    e) detaching the second contact device from the incoming and outgoing wires and the process further comprises at least one of the following steps:
    f) repeating the process steps b) to e) on further incoming and outgoing wires, without changing the temporary wires; and
    g) detaching the first contact device from the new wires in order to complete the changeover process.

2. The process of claim 1, further comprising the following process steps:
    a) connecting undisturbed, temporary wires to a new wire connecting strip device;
    b) connecting the first contact device to the new wire connecting strip device in order to produce the contact with the temporary wires;
    c) connecting a second contact device to an existing wire connecting strip device for the old wires to produce the contact;
    d) removing the old wires from the existing wire connecting strip device;
    e) connecting the new wires in the existing wire connecting strip device;
    f) detaching the second contact device from the existing wire connecting strip device; and the process further comprises at least one of the following steps:
    g) repeating the process steps c) to f) on further incoming and outgoing wires, without changing the temporary wires
    h) detailing the first contact device from the new wire connecting strip.

3. The process of claim 2, wherein the changeover device, after being plugged onto the respective wire connecting strip, is detachably secured in its position in relation to the respective wire connecting strip.

4. The process, of claim 1 wherein the process steps are carried out essentially synchronously at both ends of the temporary, old and new wires.

5. The process, of claim 1 as temporary wires, at least one of undamaged wires of a new cable, the unconnected wires of an old cable, the accessible wires of an adjacent cable and the wires of an auxiliary cable are used.

6. A changeover device for a wire connecting strip device for the uninterrupted changeover of wires of a telecommunications cable, the wire connecting strip device having a wire connecting strip, a base unit and a cover unit and the wire connecting strip having contact units for the respective connection of the incoming/outgoing wire of an incoming/outgoing telecommunications cable, in order to produce an electrical contact between the respective incoming and outgoing wires, and there being a for each contact unit a test opening which is open to the outside, the changeover device comprising A first contact device having contact elements and a second contact device in contact with the first contact device (52) and having contact elements, in the plugged-on state, the contact elements, which can be guided into the test openings, of the first and second contact devices in each case produce contact with the contact units of the respective wire connecting strip device.

7. The device of claim 6, wherein the contact elements are designed as pin elements.

8. The device of claim 6 wherein the contact elements are displaceable in the direction of their longitudinal axis and are elastically mounted.

9. The device of claim 8, wherein the contact elements are subject to the action of a spring element.

10. The device of claim 6, wherein the contact elements are in each case longitudinally displaceably mounted in a hollow profile.

11. The device of claim 6, further comprising a locking device which detachably locks the change-over device and the contact device to the wire connecting strip device when it is plugged on, the locking device engaging around the wire connecting strip device section by section from at least one of above below and from the side.

12. The device of claim 6, wherein the first contact device and the second contact device are disposed in one housing (58) (FIG. 9).

13. the devise, of claim 6, the first and the second contact device (52; 54) are disposed in separate housings and a flexible cable is disposed between the housings.

14. The device of claim 6 further comprising a positional fixing device for the temporary detachable fixing of the new wires to be inserted.

15. The device of claim 6, wherein at least one of the first or second contact device has one of 20, 40, and 50 contact elements or a multiple of the abovementioned values.

16. The device of claim 6, wherein the first contact device and the second contact device have penetration elements which produce contact by means of penetrating the insulating sheath of the respective wire.

17. The device of claim 16, wherein the first contact device and second contact device have a contact surface having a plurality of contact points, onto which the wires can be pressed down in each case in a fixed manner.

18. The device of claim 17, wherein the contact surface is elastically mounted.

19. The device of claim 17, wherein the contact points are formed by stamped-out crater tips.

20. The device of claim 6 wherein the contact devices can be detachable fastened to the changeover device.

21. The device claim 17, wherein there are at least four contact surfaces on one contact device.

22. The device as claimed in one or more of claims 18 to 21, wherein there are at least four contact surfaces on one contact device (152, 154).

23. The device of claim 6, wherein the second contact device has contact elements which are present in a grid form and onto which a wire connecting a strip device is plugged in a contacting manner.

* * * * *